United States Patent [19]
Moline

[11] 3,765,909
[45] Oct. 16, 1973

[54] METHOD OF SCORING FROZEN PIZZA
[75] Inventor: Roy Virgil Moline, Duluth, Minn.
[73] Assignee: Jeno's Inc., Duluth, Minn.
[22] Filed: Nov. 10, 1971
[21] Appl. No.: 197,456

[52] U.S. Cl. .................................. 99/192 R, 99/86
[51] Int. Cl. ............................................. A23l 1/16
[58] Field of Search .................. 99/86, 92 R, 192 R, 99/192 P, 173, 172; 62/62

[56] References Cited
UNITED STATES PATENTS
| | | | |
|---|---|---|---|
| 3,677,769 | 7/1972 | King | 99/86 |
| 1,709,709 | 4/1929 | Brizzolara | 62/62 |
| 1,646,921 | 10/1927 | Loose | 99/86 |
| 1,861,124 | 5/1932 | Lorber | 99/172 |
| 1,929,358 | 10/1933 | Keefer | 99/86 |

Primary Examiner—Norman Yudkoff
Assistant Examiner—Curtis C. Ribando
Attorney—James P. Hume et al.

[57] ABSTRACT

A frozen pizza food product and method of processing it, including a machine for performing the process. The pizza is sectioned, and the sections scored while it is at a temperature of 20° to 24° F. Die members, each carrying a cutting knife and a plurality of scoring blades, automatically processes the frozen pizza as the conveyor moves them through a die stamping unit.

7 Claims, 12 Drawing Figures

PATENTED OCT 16 1973 3,765,909

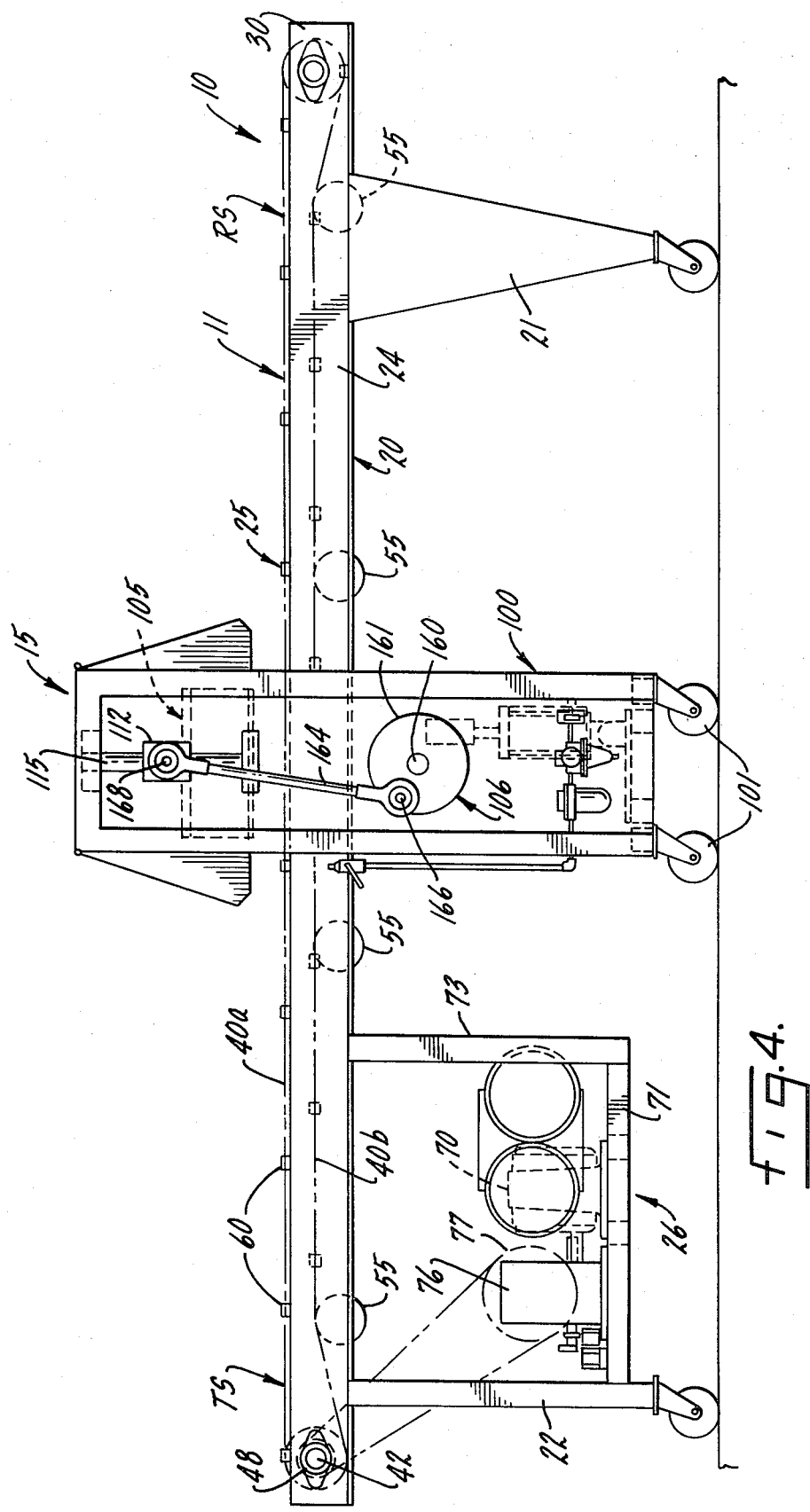

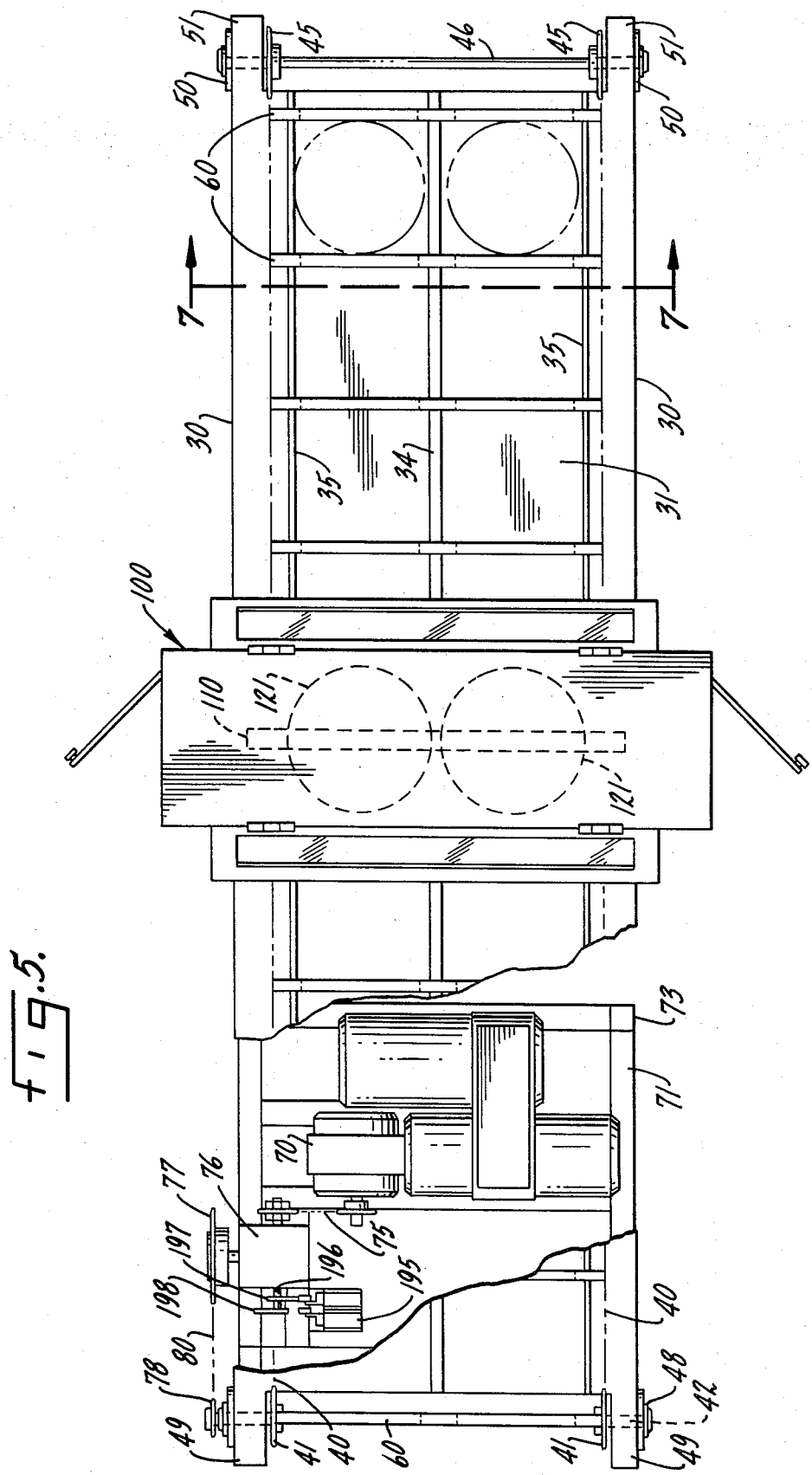

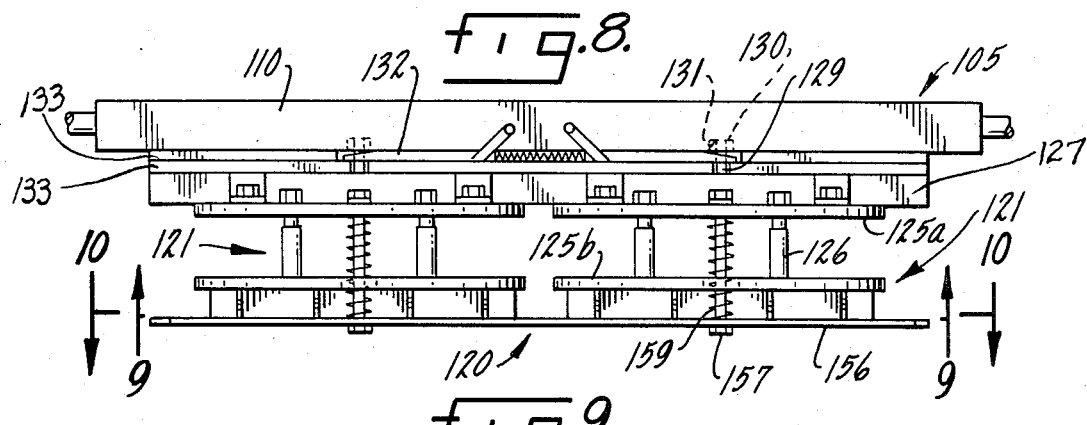
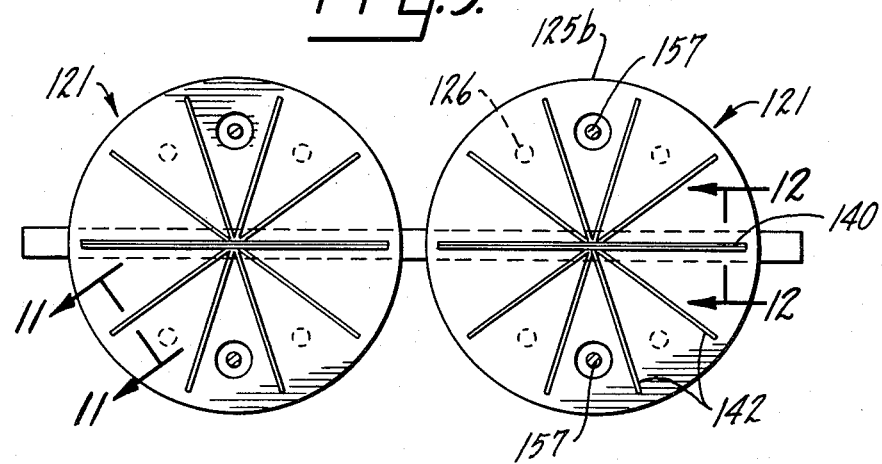
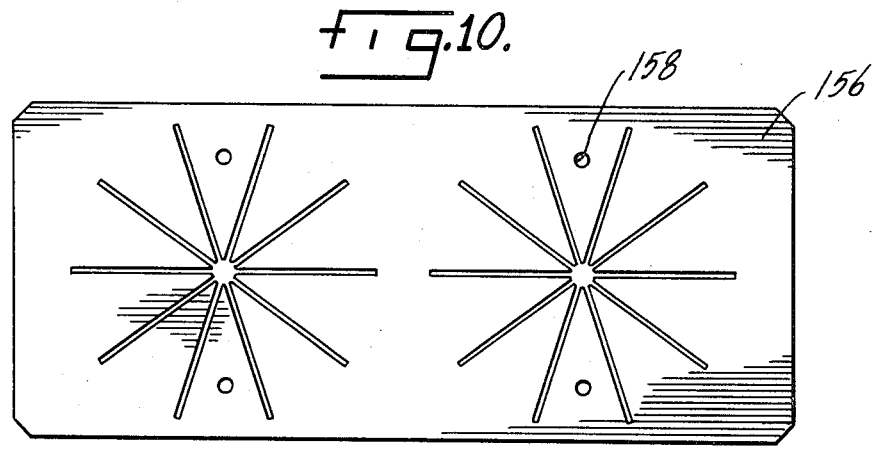
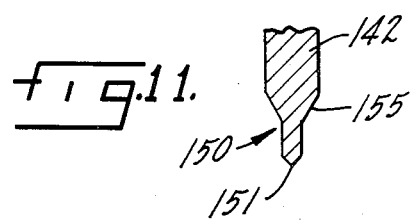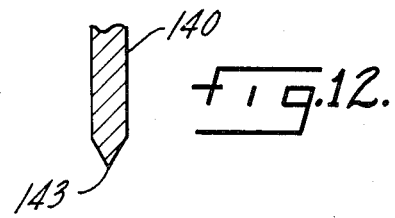

3,765,909

METHOD OF SCORING FROZEN PIZZA

BACKGROUND OF THE INVENTION

This invention relates in general to a frozen pizza food product and a method and machine for processing frozen pizza. It deals more particularly with a method of pre-conditioning frozen pizza so that it can easily be broken into pie-shaped segments by the consumer, while still frozen, and one or more of these segments then baked, independently if desired. It also deals with the product and a machine for pre-conditioning frozen pizza in this manner.

It is common practice to market individual pizzas, or pizza pies, in frozen, uncooked form. The purchaser can store the pizza in a home freezing compartment until he or she wishes to serve it. At this time, the entire pizza is conventionally placed in an oven at a predetermined temperature and baked for a prescribed length of time. Upon removal, it must be sliced or broken into pieces for individual servings.

With conventional frozen pizzas presently being marketed it is necessary to bake the entire pizza at one time. This is true even though the purchaser might want to serve only a small portion of it. Although it is conceivable that a conventional frozen pizza could be broken into smaller pieces before baking, the fact that the dough, cheese, sausage, etc., are frozen solid would make such a process difficult and messy, at the least.

SUMMARY OF THE INVENTION

It is an object of the present invention to provide a method of processing frozen pizza so that the consumer can easily separate the frozen pizza into individual, pie-shaped segments for baking. It is another object to provide a machine which slices the frozen pizza into two sections and scores each section into pie-shaped segments so that these segments can subsequently be broken from the sections and baked individually, if desired. It is yet another object to provide an improved frozen pizza food product.

The foregoing and other objects are realized in accord with the invention by providing a machine which receives a conventional, frozen pizza in its completely prepared form; i.e., the dough has been rolled and cut into circular configurations, and cheese (with, in some cases, various other foodstuffs such as sausage, pepperoni, etc.) has been applied to its upper surface. The frozen pizza is delivered to the machine from a freezing process or storage area at a temperature of 20° to 24°F. The machine moves the pizza from a receiving station to a slicing and scoring station.

At the slicing and scoring station, the frozen pizza is bisected by a cutting knife into two semi-circular segments. At the same time, the upper surface of each semi-circular section is scored along a series of radially extending score lines to define five pie-shaped segments. The score lines are formed to such a depth that only approximately one-eighth inch of pizza dough remains.

The bisected and scored pizza is stripped from the cutting knife and scoring blades at the slicing and scoring station of the machine by a stripping plate. The machine moves the pizza from the slicing and scoring station to a discharge station where it is removed for packaging in sectioned relationship. In transit, however, the two semi-circular sections remain positioned immediately adjacent each other.

BRIEF DESCRIPTION OF THE DRAWINGS

The invention, together with its construction, arrangement and method of operation, including additional objects and advantages thereof, is illustrated more or less diagrammatically in the drawings, in which:

FIG. 4 is a front elevational view of a machine for processing frozen pizza and embodying features of the invention;

FIG. 5 is a top plan view of the machine illustrated in FIG. 4;

FIG. 8 is an enlarged front elevational view of the stamping die mechanism for the machine;

FIG. 9 is a sectional view taken along line 9—9 of FIG. 8;

FIG. 10 is a sectional view taken along line 10—10 of FIG. 8;

FIG. 11 is an enlarged sectional view through one of the scoring blades in the die stamping mechanism; and FIG. 12 is an enlarged sectional view through a portion of the cutting knife in the die stamping mechanism.

DESCRIPTION OF THE PREFERRED EMBODIMENT

Figure 1:
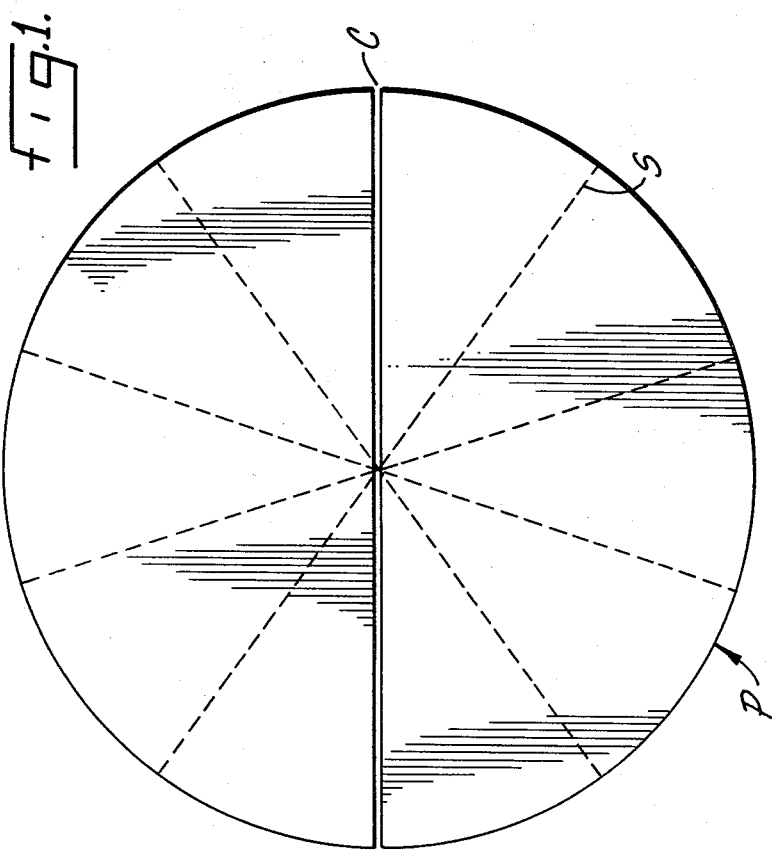
FIG. 1 is a plan view of a frozen pizza sliced and scored according to the invention.
Figure 2:
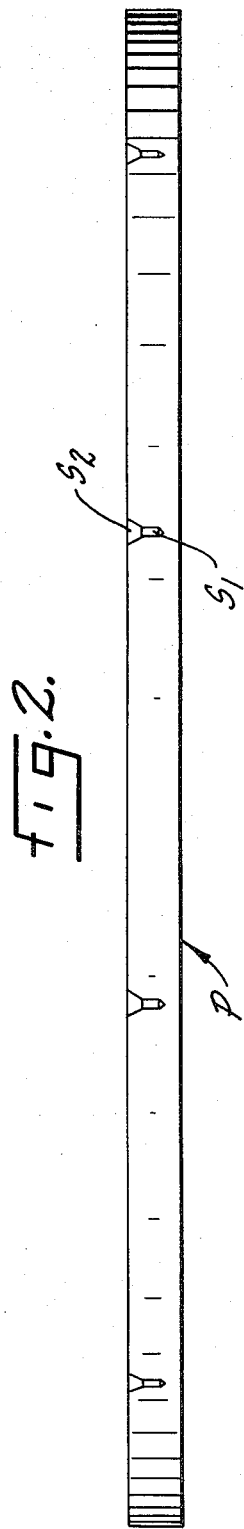
FIG. 2 is a side elevational view of the pizza seen in FIG. 1.

Referring now to the drawings, and particularly to FIGS. 1 and 2, a frozen pizza sliced and scored according to the process of the invention is illustrated generally at P. The process begins with a conventional, circular frozen pizza. In the present instance, it is a standard 10 ½ inch diameter cheese pizza. The pizza is frozen in uncooked form and, in the prior art, would be marketed in this form in a large, flat, waxed paperboard container or the like. The illustrated 10 ½ inch pizza is approximately three-eighths inches in thickness, although this might vary.

The pizza is sectioned and scored according to the invention while at a temperature of 20° to 24° F. At this temperature it is sufficiently hard to assure that clean, sharp, well-defined score lines S will be formed. At the same time, however, it is not so hard that the scoring blades cause the pizza to crack and prematurely break into segments along the score lines. This temperature range, it has been found, is also ideally suited for slicing through the pizza to bisect it along a center cut line C.

The frozen pizza is preferably sliced along the cut line C and scored on the score lines S in the same operation. In the present illustration, each semi-circular pizza section is scored along four score lines S to make five individual, pie-shaped pizza segments. The score lines S are made through about two-thirds of the three-eighths inch pizza, in the present illustration. This leaves one-eighth inch of crust to be broken through when the pizza is subsequently segmented for baking.

Figure 3:
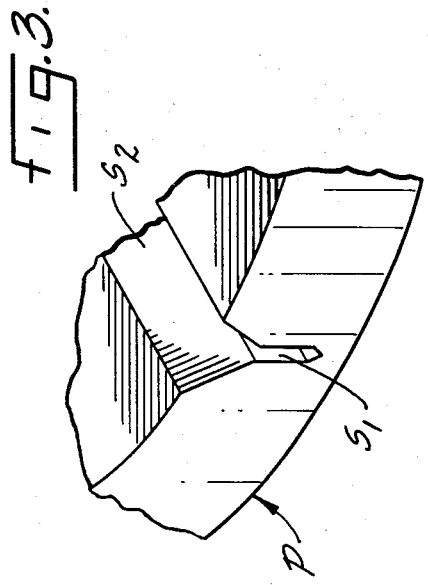
FIGS. 3 is an enlarged perspective view of a portion of the pizza illustrating the score configuration.

Each score line S is formed with a narrow, lower slit $S_1$ and an upper widening through $S_2$, as seen in FIG. 3. The bottom of the slit $S_1$ is V-shaped. The individual pizza segments break away from each other along the line defined by this V-shaped slit $S_1$ bottom. The widening trough $S_2$ at the upper surface of the pizza P gives the consumer immediate indication of where the score is located to facilitate breaking a segment or segments apart along the score lines S. By slicing the pizza into semi-circular sections along the cut lines C, access to individual segments of the pizza P to permit breaking them off is facilitated.

Figure 6:
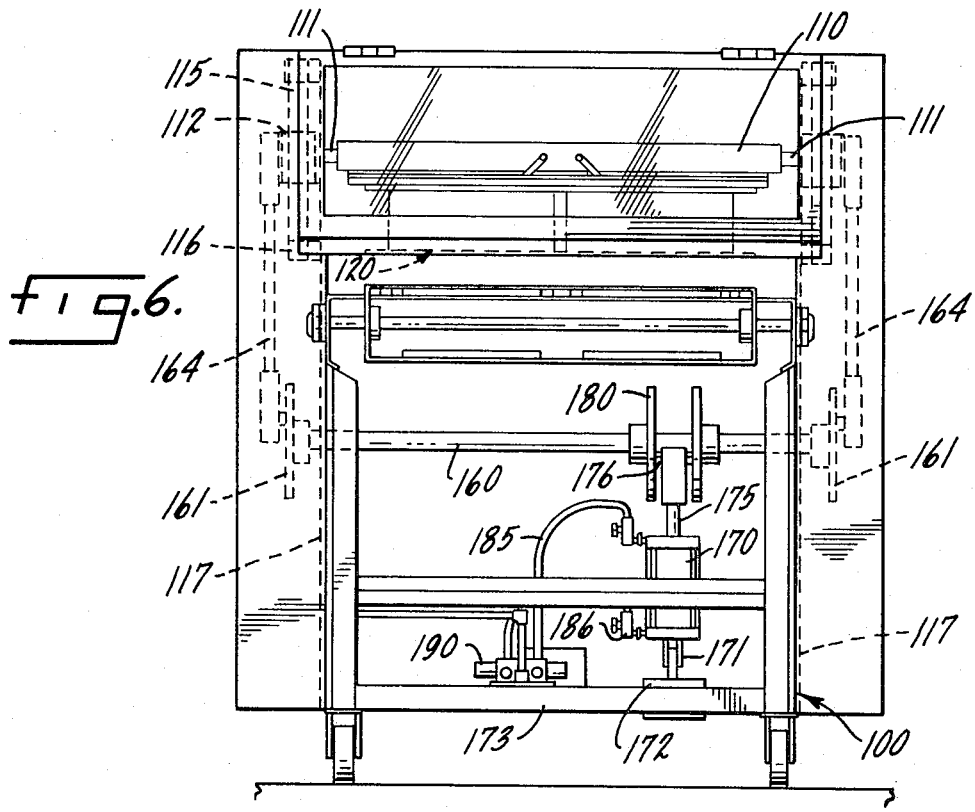
FIG. 6 is an end elevational view of the machine illustrated in FIGS. 4 and 5.

Turning now to FIGS. 4–6, a machine for slicing and scoring frozen pizza in the aforedescribed manner is illustrated generally at 10. The machine 10 is built around a horizontally elongated conveyor unit 11 which has a slicing and scoring die unit 15 disposed intermediate its ends. In operation, the conveyor unit 11 receives conventional frozen pizza pies at a receiving station RS and moves them in stages (i.e., indexes them) along its length to a transfer station TS. At the mid-point of their movement from the receiving station RS to the transfer station TS, the slicing and scoring unit 15 is effective to slice and score the pieces in the manner hereinbefore discussed. Accordingly, sliced and scored pizzas P as seen in FIGS. 1–3 are ultimately removed from the machine at the transfer station TS.

The conveyor unit 11 comprises an elongated table 20 having a pair of legs 21 at one end and a corresponding pair of legs 22 at the other end. The legs 21 and 22 support a horizontally disposed conveyor bed 24. The conveyor bed 24 mounts a conveyor assembly 25 which is driven by a conveyor drive assembly 26 suspended from the bed 24 and secured to the legs 22 adjacent the transfer station end of the table 20.

The bed 24 comprises side rails 30 unitary with a flat table top 31 and fabricated of sheet stainless steel. At this point, it might be explained that the machine 10 is fabricated to a great extent of stainless steel since it is a food handling device.

Affixed to the upper surface of the table top 31, and extending along its entire length, are a central divider rib 34, and side edge ribs 35. The significance of the divider ribs 34 and side edge ribs 35 will hereinafter be discussed in relation to the construction and operation of the conveyor 25.

The conveyor 25 includes a pair of link chains 40 extending between drive sprockets 41 mounted on a drive shaft 42 disposed at the transfer station end of the table 24 and driven sprockets 45 mounted on a driven shaft 46 disposed at the receiving station end of the table. The drive shaft 42 is journalled for rotation in bearings 48 mounted on free ends 49 of the side rails 30 while the driven shaft 46 is correspondingly journalled in bearings 50 mounted on opposite free ends 51 of the side rails.

The carrying reach 40a of each chain 40 travels over the table top 31 outboard of a corresponding one of the side edge ribs 35. The return reach 40b, on the other hand, travels beneath the table top 31 and is supported in its travel thereunder by conventional return sprockets 55 suitably journalled between the side rails 30.

Figure 7:
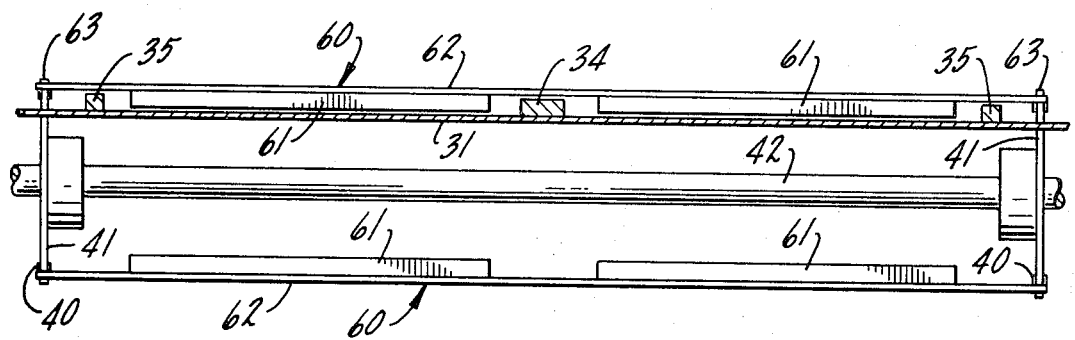
FIG. 7 is an enlarged sectional view taken along line 7—7 of FIG. 5.

Connecting the chains 40 at evenly spaced intervals of twelve inches are a series of identical flight bars 60. As seen best in FIG. 7, each of the flight bars 60 comprises a pair of fiber bars 61 fastened to and depending from an elongated strip 62 of stainless steel. The stainless steel strip 62 is fastened by pin connectors 63 at its opposite ends to the conveyor chains 40. The fiber bars 61 are of such dimensions that they slide along the table top 31 as they move with the conveyor chains 40. Furthermore, the length of each bar 61 is such that it extends substantially the entire distance between a corresponding side rib 35 and the center divider rib 34 without scraping against the ribs.

The drive mechanism 26 for the conveyor 25 includes a conventional three-fourths horsepower motor 70 mounted on a sub-table 71 fastened to the legs 22 and supported at its opposite end by support members 73 secured to the side rails 30 of the conveyor bed 24. The motor 70 drives a Ferguson indexing unit 76 through a conventional sprocket and chain arrangement 75 connected to its output shaft. The Ferguson indexing unit 76 is connected to the conveyor 25 through a sprocket 77 on its output shaft, a smaller sprocket 78 on one end of the conveyor drive shaft 42, and a sprocket chain 80.

The motor 70 provides an input to the indexing unit 76 input shaft at a speed selected by the machine operator. The indexing unit 76, in turn, transforms this shaft input into an intermittant drive output to the conveyor 25 through the sprocket chain 80. In the present illustration, the conveyor 25 is driven at any selected speed up to 40 inches per minute, in 12 inch stages, with a ten second delay between each stage of movement. During this ten second delay the slicing and scoring unit 15 is automatically actuated to slice and score two frozen pizzas, simultaneously.

The slicing and scoring unit 15 comprises an upright, box-like housing 100 which is supported by four caster wheels 101. The housing 100 encloses, in effect, the conveyor bed 24 and the conveyor 25 at its mid-point, and contains a stamping die mechanism 105 above the table connected to a stamping die drive mechanism 106 below the table. The stamping die drive mechanism 106 is air pressure operated to intermittantly drive the stamping die mechanism 105.

The stamping die mechanism 105 includes an elongated cross member 110, of rectangular cross-section, rigidly secured through mounting pins 111 at its opposite ends to bearing sleeves 112. The bearing sleeves 112 are vertically slidable between an upper retracted position and a lower actuated position on bearing shafts 115 rigidly secured by brackets 116 to the opposite side walls 117 of the housing 100. The mounting pins 111 extend through suitably formed, elongated, vertical apertures in the side walls 117, from the member 110 to the bearing sleeves 112.

Referring now to FIGS. 8–10, the stamping die mechanism 105 includes a die sub-assembly 120 releasably connected to the member 110 and depending therefrom. The die sub-assembly 120 moves vertically with the cross member 110 in its travel on the bearing shafts 115.

The die sub-assembly 120 includes two identical dies 121. Each die 121, in turn, comprises two circular die plates 125a and 125b which are rigidly interconnected by posts 126. The upper plate 125a of each die 121 is secured to a cross-bar 127. The crossbar 127 is, in turn, releasably connected to the cross member 110. To this end, two connector pins 129 having enlarged heads 130 formed thereon extend upwardly from the bar 127 and are releasably received in corresponding seats 131 formed in the cross member 110. Springloaded detents 132 cam the heads 130 upwardly and, accordingly, the bar 127 tight against detent mounting plates 133 on the member 110.

Secured to the bottom of each lower plate 125b is a single cutting knife 140 which extends across the plate on its diameter. Radiating from the center of each plate 125b, on opposite sides of the knife 140 in evenly spaced relationship, are eight scoring blades 142. The blades 142 are also secured to the corresponding plate 125b.

The cutting knife 140 is a flat stainless steel strip with a simple knife edge, as at 143. It is designed to slice completely through the frozen pizza, at C. On the other hand, the scoring blades 142 which adapted to form the score lines S, have a configuration embodying specific features of the invention.

Referring to FIG. 11, it will be seen that the lowermost blade section 150 terminates V-shaped to an edge 151. Approximately one-eighth inch above this edge 151, the blade section 150 is seated in a wider, scoring base 155. The sides of the scoring base 155 are, as illustrated, beveled outwardly from the blade section 150 at an angle of approximately 45°. The blade section 150 forms the lower slit $S_1$ in the score line S while the base 155 forms its widening trough $S_2$.

In slicing and scoring the frozen pizza to form the pizza P embodying features of the invention, the knives 140 and blades 142 pass through corresponding slots formed in a stripper plate 156 secured, in springloaded, lost-motion relationship, to the bottom of both plates 125b. Normally, however, the stripper plate 156, which is connected to each plate 125b by two bolts 157 extending loosely through corresponding holes 158 in the stripper plate and threaded into the plate 125b, is biased into a position even with the lower edges 151 of the scoring blades 142 by coil springs 159 encircling the bolts.

The stamping drive mechanism 106 includes a crank shaft 160 extending between the opposite side walls 117 of the housing 100 below the conveyor bed 24 and journalled in the walls 117. Secured to opposite free ends of the crank shaft 160, outside the walls 117, are crank discs 161. Identical connecting rods 164 are pivotally mounted at their lower ends on the peripheries of corresponding crank discs 161, as at 166. The rods 164 are, correspondingly, pivotally mounted at their upper ends on the bearing sleeves 112, as at 168.

The crank shaft 160 is rotatable through an arc of 60° by an air motor 170. The motor 170 is of conventional construction and is pivotally mounted, as at 171, on a mounting plate 172 secured to the floor 173 of the housing 100. The motor 170 contains a vertically movable piston (not shown) from which the piston rod 175 extends. The upper end of the piston rod 175 is pivotally connected, as at 176, to a crank arm disc assembly 180. The crank arm disc assembly 180 is secured to the crank shaft 160 in a conventional manner.

The air motor 170 is double-acting; i.e., it has air inlet-outlet conduit 185 connected to its upper end and a similar air inlet-outlet conduit 186 connected to its lower end. The inlet-outlet conduits 185 and 186 are, in turn, connected through a three-way solenoid valve 190 of conventional construction to a source of air under pressure (not shown) via an air supply conduit 192.

Operation of the solenoid valve 190 is controlled through conventional circuitry (not shown) by a microswitch assembly 195 adjacent the indexing unit 76. An auxiliary output shaft 196 of the indexing unit 76 carries a pair of cams 197 and 198 which are effective to alternately close contacts in the micro-switch 195 and thus, through the aforementioned circuitry, cause the solenoid valve 190 to direct air under pressure through either the inlet-outlet conduit 185 to the top of the cylinder 170 or through the inlet-outlet conduit 186 to the bottom of the cylinder 170.

In operation, a pair of frozen pizzas are delivered by appropriate delivery means to the receiving station RS of the machine 10 and deposited on both sides of the divider rib 34 on the table top 31, between adjoining flights 60. The conveyor 25 is continuously moving, in 12 inch stages with 10 second delays between stage movements in a manner hereinbefore described, toward the transfer station at the opposite end of the machine 10. The pizzas are, accordingly, moved along the smooth table top 31 by a corresponding flight 60. After each 12 inch move, two additional pizzas are deposited on the table top 31 between appropriate flights 60.

After each 12 inch movement stage of the conveyor 25, the indexing unit 76, through the cams 197 and 198, releases one of the switches in the micro-switch 195 while closing another. This is effective to cause the solenoid valve 190 to direct fluid under pressure through the inlet-outlet conduit 186 to the lower end of the air cylinder 170. The piston rod 175 is driven upwardly, rotating the crank arms 160 in a counterclockwise direction, as seen in FIG. 4. The connecting rods 164 are, accordingly, drawn downwardly, drawing the die mechanism 105 with them.

The indexing unit 76 has precisely positioned a pair of frozen pizzas underneath the dies 121 of the die mechanism 105. The dies 121 continue to move downwardly and the knives 140 slice through each of the pizzas, bisecting them. At the same time, the scoring blades 142 score the pizzas in the manner hereinbefore described. The length of the connecting rods 164 is adjusted so that the knife edges 153 come, at their lowermost point of travel, just into engagement with the table top 31. At this point, the scoring blade edges 151, being one-eighth inch higher than the slicing blade edge 143, have scored the pizza through all but one-eighth inch of its thickness.

The stripper plate 156 is, of course, stopped in its downward movement when it engages the frozen pizzas. The springs 159 compress. The knives 140 and blades 142 pass through the slots in the plate. When the dies 121 begin to retract, the now spring-loaded plate strips the sliced and scored pizzas P from the dies.

The auxiliary output shaft 196 of the indexing unit 76, has continued to move during this 10 second delay of the conveyor and before the conveyor is moved again in its next stage of movement the cams 197 and 198, reverse switching within the micro-switch 195 and the solenoid valve 190 is triggered back to its original position. Air is directed through the inlet-outlet conduit 185 to the upper end of the air cylinder 170 and the piston rod 175 is driven upwardly. The die subassembly 120 is retracted.

The indexing unit 76 moves the conveyor 25 another 12 inches. The die stamping process is repeated; and so it continues. When the sliced and scored pizzas reach the transfer station TS, they are removed for packaging.

While the embodiment described herein is at present considered to be preferred, it is understood that various modifications and improvements may be made therein.

What is desired to be claimed and secured by Letters Patent of the United States is:

1. A method of processing pizza, comprising the steps of:
   a. treating an unbaked pizza to freeze the pizza and lower its temperature to within the range of 20°F through 24°F, and
   b. scoring the frozen pizza along a score line so that it can subsequently be easily broken into segments along the score line.

2. The method of claim 1 further characterized by:
   a. scoring the frozen pizza by pressing a blade edge into it so that a readily visible score line is formed.

3. The method of claim 2 further characterized by:
   a. scoring the frozen pizza on only one of its surfaces.

4. The method of claim 3 further characterized by:
   a. scoring the frozen pizza on said one surface to a depth exceeding one-half the thickness of the pizza.

5. The method of claim 3 further characterized by:
   a. scoring the frozen pizza on said one surface through all but approximately one-eighth inch of the thickness of the pizza.

6. The method of claim 2 further characterized by and including the step of:
   a. slicing the frozen pizza on its diameter into two generally semi-circular sections, and
   b. scoring each semi-circular section in a radial pattern of score lines.

7. A method of processing pizza, comprising the steps of:
   a. treating an unbaked pizza to freeze the pizza and lower its temperature to within the range of from 20°F. through 24°F.,
   b. slicing the frozen pizza on its diameter into two generally semi-circular sections,
   c. scoring each section of the pizza in a radial pattern to form radially extending visible score lines of predetermined depth so that each section will readily break into pie-shaped segments of pizza along the score lines.

* * * * *